United States Patent [19]

Hopper

[11] 4,214,575
[45] Jul. 29, 1980

[54] SOLAR ENERGY COLLECTOR

[75] Inventor: Thomas P. Hopper, Durham, Conn.

[73] Assignee: Sunworks, Inc., Guilford, Conn.

[21] Appl. No.: 6,004

[22] Filed: Jan. 24, 1979

Related U.S. Application Data

[63] Continuation-in-part of Ser. No. 854,153, Nov. 23, 1977.

[51] Int. Cl.² .................................................. F24J 3/02
[52] U.S. Cl. .................................................. 126/450
[58] Field of Search ...................... 126/270, 271, 450; 237/1 A; 285/352; 68/5 E; 277/207 R, 207 A, 208–211, 152; 34/242; 52/403

[56] References Cited

U.S. PATENT DOCUMENTS

| | | | |
|---|---|---|---|
| 3,140,105 | 7/1964 | Bielinski | 285/352 |
| 3,831,984 | 8/1974 | Kutina | 285/352 |
| 3,916,871 | 11/1975 | Estes | 126/271 |
| 4,073,283 | 2/1978 | Lof | 126/271 |

*Primary Examiner*—James C. Yeung
*Attorney, Agent, or Firm*—DeLio and Montgomery

[57] ABSTRACT

Solar heat energy collectors of the gaseous heat exchange type where the absorber is in the form of a duct completely out of thermal contact with the collector housing and extending between openings in opposite sides of the housing. Resilient seals are provided about the housing openings and compressively engaged with each other to prevent egress of heated gas or ingress of ambient air.

16 Claims, 12 Drawing Figures

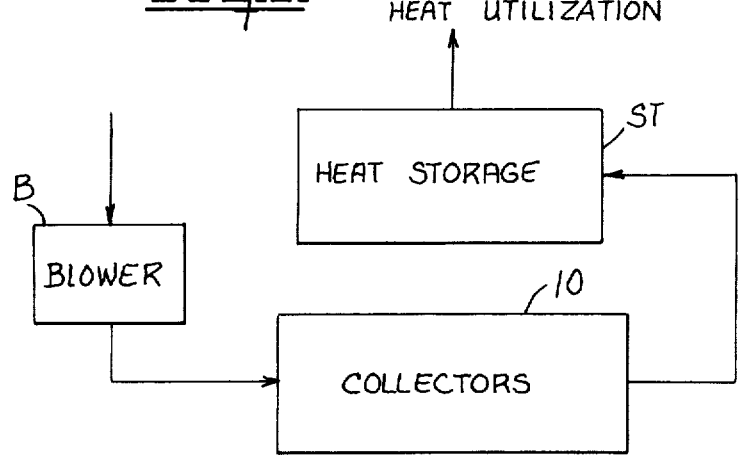
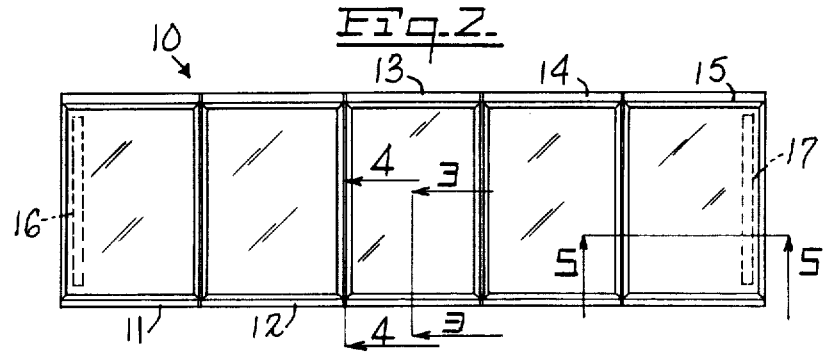

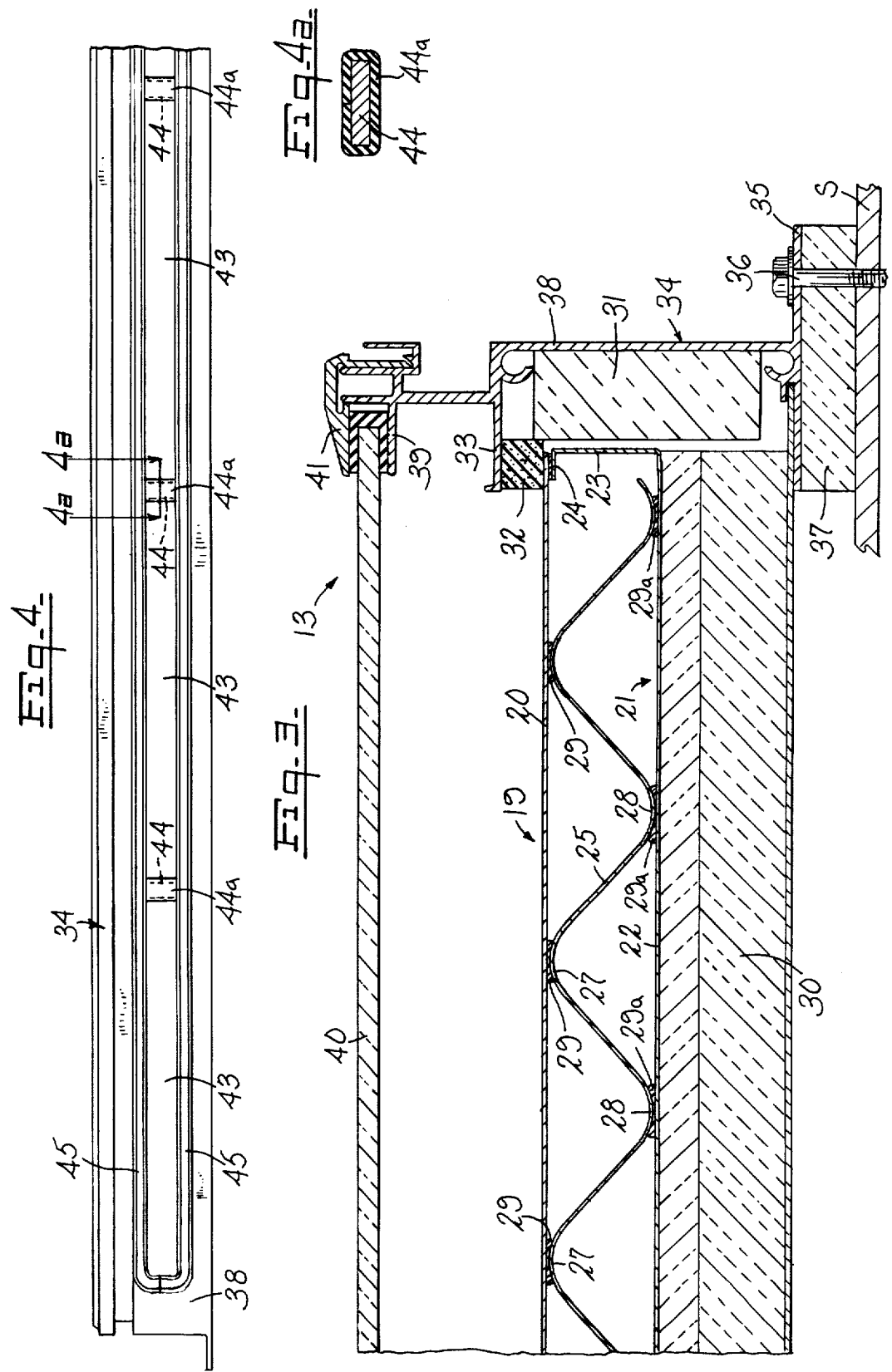

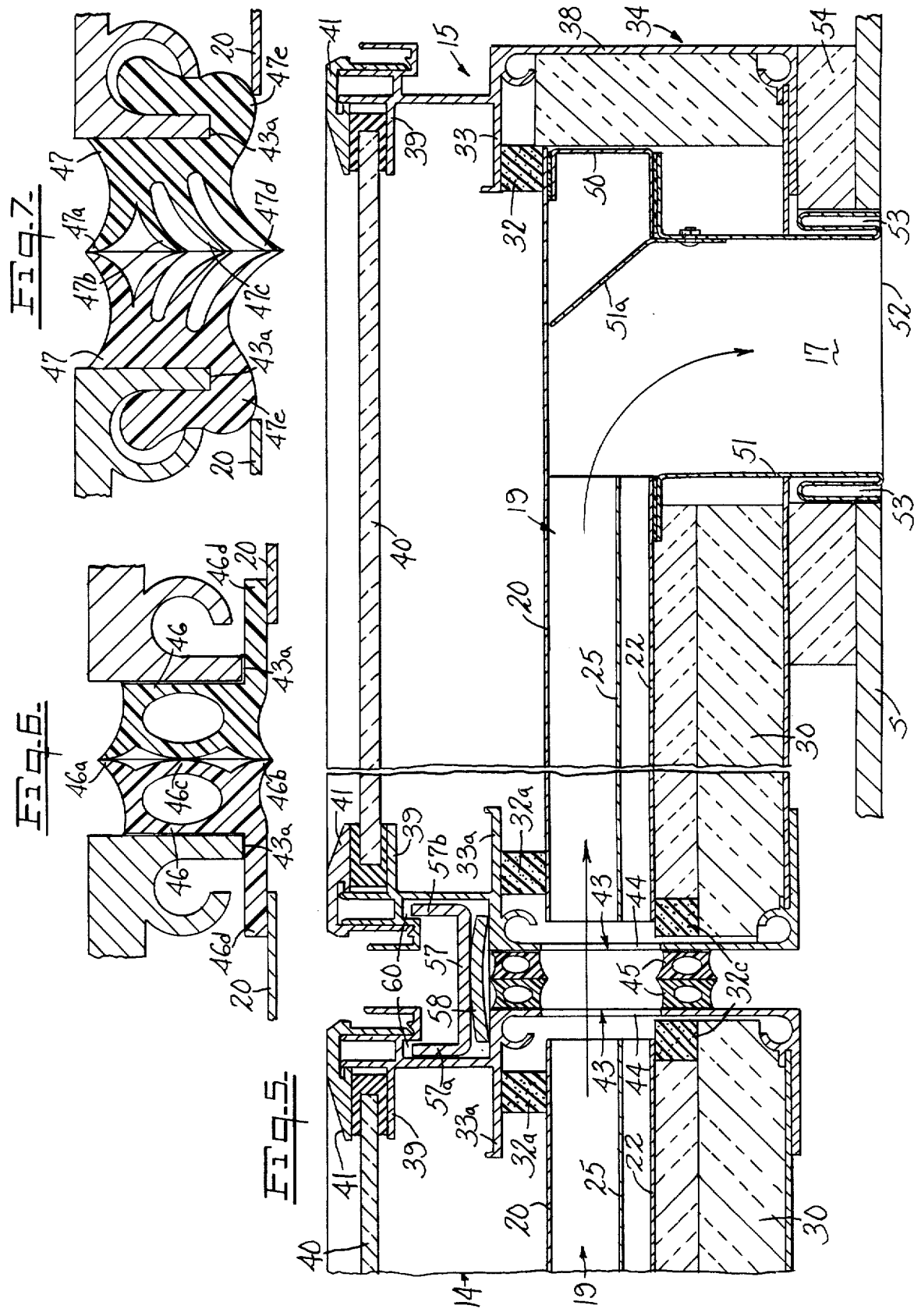

SOLAR ENERGY COLLECTOR

This application is a continuation-in-part of co-pending application Ser. No. 854,153, filed Nov. 23, 1977.

This invention relates to solar collectors and more particularly relates to solar collectors of the air heat exchange type.

Co-pending application Ser. No. 854,153 discloses a solar collector of the type where heat energy of an absorber is transferred to air or other gaseous fluid passing thereunder. The referenced application further discloses and claims a new and improved heat transfer member beneath the absorber to transfer heat from the underside of the absorber and increase the heated surfaces along and across which the air passes, and discloses a new and improved construction for solar collectors of the air heat exchange type.

Solar collectors are generally made in module form and joined together in such manner that the heat exchange medium passes through adjacent collectors. In connecting solar collectors such that a gaseous heat exchange medium passes between collectors, it is quite important to minimize any heat loss at the points where the collectors are joined and also quite important to insure that there are only minimal if any conduction losses between the absorber and the collector frame.

The present invention provides a new and improved solar collector construction of the gaseous fluid heat exchange type wherein the absorber is so formed as to define a duct within the collector housing which is fully insulated from the housing so that there is only minimal if any loss of thermal efficiency due to conduction. Moreover, a solar collector constructed in accordance with the invention provides a straight-through path for the air flow between collectors with minimal impingement of the moving air on any part of the collector frame. Still further, the present invention provides a new and improved coupling between solar collectors of the type described which minimizes loss of thermal efficiency as the moving air passes from one collector to the next, and further prevents egress of ambient air.

Briefly stated, the invention in one form thereof comprises a solar collector having a rectangular frame defining a housing with openings defined in two of the frame members for passage of air therebetween. Disposed in each collector housing is an absorber defined generally in the form of a duct with the upper surface having a selective coating to enhance absorption of solar energy while the air to be heated passes in the duct below the absorber. Furthermore, the openings between the adjacent collector housings are so constructed and sealed that the loss of heat energy at the coupling between the collectors is substantially eliminated and further there is minimal impingement of the heated air on the collector frames at the areas of coupling.

An object of this invention is to provide a new and improved solar energy collector of the gaseous heat exchange type.

Another object of this invention is to provide a solar energy collector of the gaseous heat exchange type having a new and improved construction for minimizing thermal losses.

A further object of this invention is to provide a solar energy collector of the air heat exchange type having new and improved means for joining adjacent collectors.

The features of the invention which are believed to be novel are particularly pointed out and distinctly claimed in the concluding portion of this specification. The invention, however, both as to its organization and operation may best be appreciated by reference to the following detailed description taken in conjunction with the drawings, wherein:

FIG. 1 is a schematic diagram of the major components of a solar energy heating system in one mode of operation;

FIG. 2 is a plan view of an array of collectors of a gaseous heat exchange type;

FIG. 3 is a sectional view seen in the plane of lines 3—3 of FIG. 2;

FIG. 4 is a view seen in the plane of lines 4—4 of FIG. 2;

FIG. 4a is a sectional view seen in the plane of lines 4a—4a of FIG. 4;

FIG. 5 is a view seen in the plane of lines 5—5 of FIG. 2;

FIG. 6 is an enlarged view of a portion of FIG. 5 showing an alternate sealing arrangement;

FIG. 7 is a view in section similar to FIG. 6 showing another form of sealing arrangement;

Figure 8:
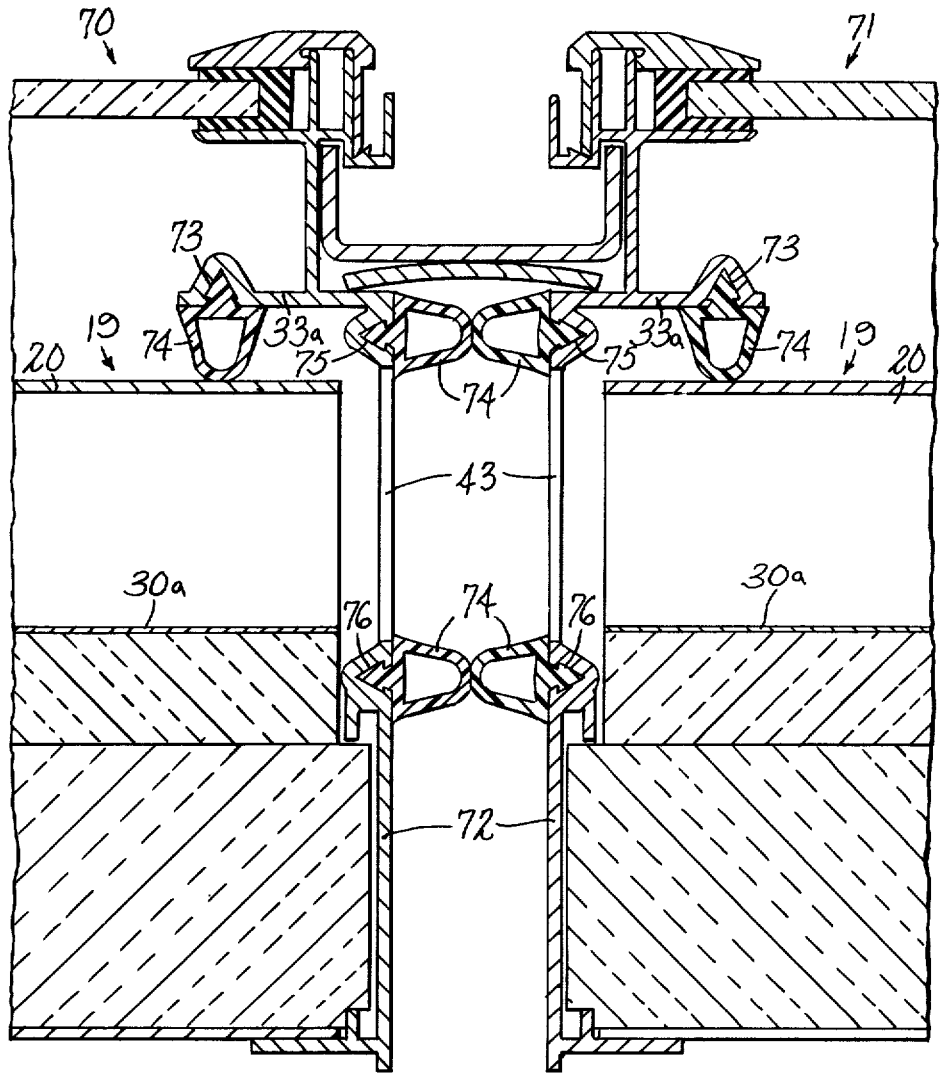
FIG. 8 is a section view through a portion of two collectors showing another sealing arrangement.

A solar energy heating system of the air heat exchange type is exemplified in FIG. 1 and comprises a collector array 10 through which air is circulated by a blower B to a heat storage device ST and to the interior of a structure. Only one mode of operation of the system is shown, in which air is drawn from the structure to the collector system by the blower and hence to storage. Heat is transferred from the storage system for utilization by any suitable means.

The collector array 10 is mounted to a structure S, FIG. 3, and is exemplified by a series of collectors 11-15 (FIG. 2). The collector array is mounted at an angle from the horizontal to receive maximum benefit of solar radiation at the latitude of installation.

The end collectors 11 and 15 have bottom openings 16 and 17, respectively, as hereinafter described through which air is circulated through the collector system.

The housings of the collectors as shown in FIG. 3 may be of the type disclosed and claimed in co-pending U.S. Application Ser. No. 772,971, filed Feb. 28, 1977, now U.S. Pat. No. 4,123,883, the disclosure of which is incorporated by reference, and will not be described in detail.

A sectional view of collector 13 is shown in FIG. 3. Collector 13 and the other collectors include within a rectangular housing an absorber assembly 19 in the form of a duct of rectangular cross-section. The upper wall of the duct is an absorber 20 which may have a selective surface thereon. The absorber 20 is joined to a member 21 having a bottom wall 22 and upstanding side walls 23 with a turned over flange 24 which is bonded in good heat transfer relation to the underside of absorber 20 continuously through its length with a bonding agent of good thermal conductivity. A suitable bonding agent is an epoxy known as Ecco-Bond 281, marketed by Emerson and Cummings, Inc. of Canton, Massachusetts or 3M 2214. Such bonding agents have high thermal conductivity. These bonding agents also are dielectric, which characteristic meets requirements hereinafter stated. Disposed within duct 19 is a heat transfer member 25 shown as being corrugated and having upper 27 and lower 28 ridges which alternately contact the underside of absorber 20 and the bottom 22 of the duct. The bonding agent, as shown, fills an area of contact between the ridges much greater than would be the direct contact area of the ridges on the duct. This enhances transfer of heat from absorber 20 to member 25.

Member 25 serves several functions. It rigidizes the duct construction. It transfers heat to the bottom 22 of the duct, it radiates heat into the passages defined thereby, and it gives up heat by contact to the air scrubbing thereon.

The ridges 27 and 28 of heat transfer member 25 are bonded essentially continuously throughout their lengths to the underside of absorber 20, and to the bottom 22 of the duct by a bonding agent of the type heretofore described. This establishes a large area for heat transfer between member 25, absorber 20 and bottom wall 22. Such areas of bonding contact are indicated at 29 to the absorber and at 29a to the bottom wall 22. Member 25 may take other forms as hereinafter disclosed, but generally speaking it is of repetitive, substantially symmetrical configuration across the width of the interior of a duct 19 and provides a heat transfer path from the absorber to bottom wall 22. The surfaces of heat transfer member 25 may be roughened or otherwise made with a non-smooth surface to enhance the scrubbing action of the air passing thereover, and increase the heat exchange efficiency.

Heat transfer member 25 defines with absorber 20 and the member 21 a multiplicity of individual passages through which air passes. The multiplicity of passages maximizes heated surface contact with the air and enhances transfer of heat to the air. For most efficient heat transfer, the bond between the ridges of member 25 should be continuous wherever the heat transfer member comes in contact with or is in close proximity to absorber 20 or bottom wall 22. The continuous bonds permit substantially uniform heat transfer from the absorber and prevents hot spots which might occur if the points of contact were only intermittent, such as might occur with mechanical fasteners.

The duct 19 may be formed of dissimilar metals such as a copper absorber and aluminum heat exchanger and bottom wall, and in the case of the end collectors, galvanized steel or other non-corrosive inlet and outlet ducts. The dielectric properties of the bonding agents previously mentioned prevents electrolysis between the dissimilar metals in each case.

Within the housing, the duct 19 rests on a bed of one or more layers of insulation 30. Additionally, lengths of insulation 31 space and insulate the duct from the collector housing. An upper length of thermal insulation 32, preferably of a compressible closed cell material, forms an essentially airtight seal at the edge of duct 19 and spaces the duct from a condensation trough 33. A similar seal 32a forms an airtight seal between the trough 33a above openings 43 and absorber 20 (FIG. 5). A lower seal 32c is provided beneath the edge of duct 19 at opening 43. The duct is completely insulated for thermal conductive contact with the housing.

The collector housings 34 may be formed with flanges 35 extending outwardly from the top and bottom, and fasteners such as bolts or screws 36 tie the housings to a structure S.

The collectors may be mounted on shimming members 37 to permit air circulation between the collectors and the structure S. The collector housings further comprise an upstanding wall 38 including a support ledge 39 for a transparent cover member 40, and a cap member 41.

The sides of the collectors as exemplified in FIG. 4 have an opening or a plurality of openings 43 defined therein in communication with the ducts 19. The ends of the duct extend very close to the edges of openings 43. The small struts 44 between the openings 43 are left in the housing wall only for purposes of rigidity of the housing. A seal 45 is provided around all of openings 43 as hereinafter described. The struts 44 are also preferably thermally insulated, as by example with a piece of split insulating tubing 44a wrapped therearound as shown in FIG. 4a. Alternatively, the struts could be wrapped with a thermal insulating tape.

Reference is now made to FIG. 5 which is a section through end collector 15. Duct 19 in collector 15 is closed at its end by a member 50. A transition duct 51 is coupled to the bottom wall 22 of duct 19 together with a deflector 51a to direct the air passing through the collectors and into collector 15 to exit at the bottom, previously identified as opening 17. Duct 51 is bonded to the underside of duct 19 and is formed at its bottom edge 52 with recesses 53. Recesses 53 are formed to receive the straight walls of a connecting duct (not shown) which extends into the structure S. The lower portion of transition duct 51 is surrounded by a closed cell insulating and sealing material 54. The transition duct is dimensioned to fit between adjacent joists of the structure S.

The transition duct 51 will generally be of galvanized sheet metal or other corrosion resistant sheet stock and therefore the bonding agent has the same dielectric characteristics as previously mentioned.

Adjacent collectors are so positioned that the seals 45 are in compressive contact. The seals are preferably of a closed cellular material, and so formed as to ensure no escape of air from the housing at the joists and further to prevent any ingress of ambient air.

The seals 45 are shown in enlarged proportion in a slightly modified form 46 in FIG. 6. Mating seals have three areas of contact along the lengths thereof. The upper tips 46a of the seals will be forced into tighter sealing engagement if the pressure of the air outside of the housings should be greater than the pressure of the air moving through the ducts 19. If the conditions should be reversed, the lower tips 46b will then be pressed inwardly to effect sealing contact. At all times, all three areas are in contact, especially the mid-portions 46c of the seals. The seals 45 and 46 are applied to the walls of the housing with a suitable adhesive. The seals 46 differ only from the seals 45 in the provision of a flange 46d which extends inwardly through openings 43 and contact the upper and lower surfaces of duct 19. This arrangement insulates the edges 43a about openings 43 and prevents loss of heat to the collector housings.

In FIG. 7, another form of seal 47 is shown, having a mechanical interlock about the edges 43a of the collector housing defining the opening 43. The seals 47 have a multiplicity of fingers 47a–47d in compressive contact. The fingers 47a are urged into tighter engagement if the ambient pressure is greater than the pressure within the sealing fingres. Similarly, the fingers 47d are urged into tighter engagement if the ambient pressure is less than the pressure within the sealing fingers.

The portions 47e of seals 47 insulate the edges 43a of the housing which might otherwise be heated by air as it passes from the duct 19 of one housing into the duct 19 of another housing.

The seals 45 and 46 are preferably of a closed cell resilient material. If solid in cross-section, as shown in FIG. 7, the seals are chosen to be very soft to ensure compressibility and good sealing engagement.

To further ensure an airtight seal, a sealant such as a silicone gel may be applied between contacting surfaces of adjacent seals to fill any irregularities in the surfaces of the seal which might define small air passages.

The adjacent collector housings are maintained in parallel spaced arrangement with the seals 45 compressively engaged by means of a connecting member in the form of a U-shaped channel member 57 having ends 57a and 57b which are received in bottom opening channels 60 defined in the collector housings. In assembly, the adjacent collectors are positioned with one or more members 57 therebetween and aligned by the upstanding legs 57a and 57b. Then a shimming member 58 is inserted under each member 57, raising the legs 57a and 57b up into the passages 60. If continuous, member 57 also serves as a covering above the junction of the collectors. Otherwise, the space between the collectors may be covered by flashing, as disclosed in U.S. Pat. No. 4,123,883.

Figure 9:
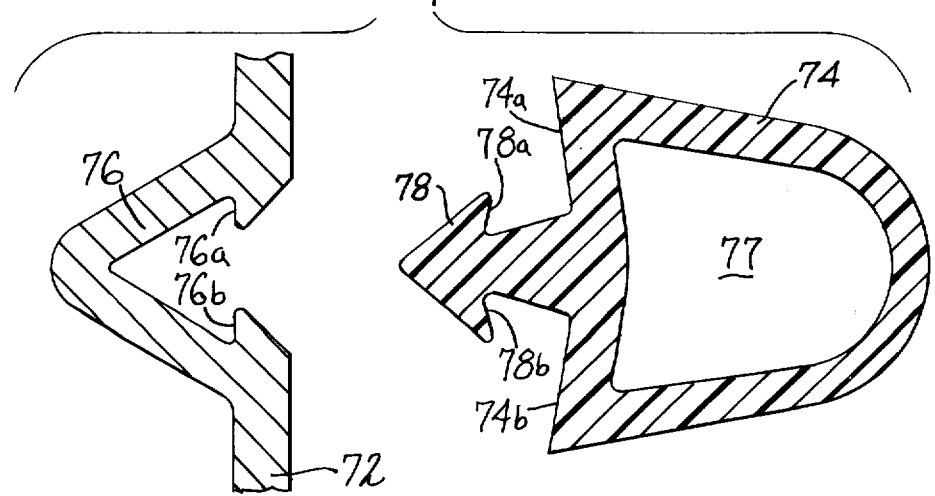
FIG. 9 is an enlarged view of the sealing arrangement of FIG. 8.

FIGS. 8 and 9 exemplify another embodiment of the invention, where the seals are mechanically interlocked to the frame.

Two collectors 70 and 71 are arranged so that the openings 43 in the side walls thereof are aligned, as are the ducts 20. The absorber frame members 72 are extruded lengths, and are mitered and joined to form housings. In FIG. 8, like elements to those of FIG. 5 bear the same reference numeral.

The absorber assembly 19 of FIG. 8 may be merely a sheet formed into an inverted U-shape which rests on a laminated foil 30a on insulation 30 to form an air duct. The upper surface 20 is the absorber.

Defined in trough 33a is an interlock 73 receiving an elongated sealing member 74 which bears on duct 20, and maintains the duct out of contact with the housing while permitting expansion and contraction of duct 19. Upper interlocks 75 and lower interlocks 76 are defined in the side wall frame members and spaced above and below opening 43. The interlocks are formed integrally with the frame 72 of the collectors.

As exemplified in FIG. 9, each of the interlocks represented by 76 receives an elongated sealing member 74 defining a hollow air chamber 77 and having a locking tab 78 generally in the form of an arrowhead which is adapted to be received in one of interlocks 73, 75, or 76. The locking portion 78, which is resilient, may be easily inserted into an interlock such as 76 and locked therein by virtue of the configuration.

Locking portion 78 is configured to fill the interlocks 73, 75 and 76 and resist removal by virtue of the surfaces 78a and 78b in contact with surfaces of the interlock as exemplified by 76a and 76b in FIG. 9. The seals are preferably hollow, as shown, but may be of closed cell material. At the ends of the openings 43 the locking tab 78 is removed and the surfaces 74a and 74b adhered to the walls 72.

The construction provides a releasable locking of the seals to the collector housing and facilitates attachment of the seals 74 during construction of the collector.

In practice, the seals 74 of adjacent collectors will be compressed more than shown in FIG. 8 to provide a greater area of sealing contact. This will prevent any ingress of ambient air, or egress of the heated air between ducts 19 of adjacent collectors. As shown in a relaxed position in FIG. 9, the surfaces 74a and 74b of seal 74 are inclined outwardly toward the edges. Then when the locking tab 78 is inserted in an interlock, the surfaces 74a and 74b will be tightly drawn against side walls 72 in good sealing contact.

Figure 10:
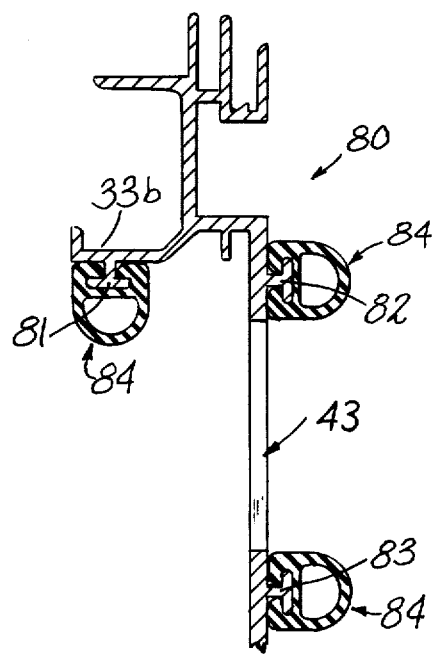
FIG. 10 is a sectional view through another collector frame with sealing members.
Figure 11:
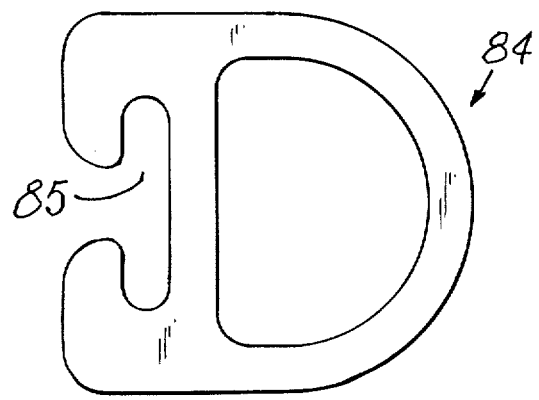
FIG. 11 is an enlarged view of the sealing members of FIG. 10.

FIGS. 10 and 11 exemplify another embodiment of the invention where locking tabs for the seal are defined on the collector frame.

A frame 80 is shown only in part since the complete structure will be evident from the previous figures. A locking tab 81 extends below trough 33b, and locking tabs 82 and 83 extend outwardly on either side of passage 43. The tabs are generally T-shaped. Seals 84 are formed with an interlock 85 of complementary shape to the tabs, and will compressively engage the tabs 81, 82, and 83. At the ends of the openings 43, the seals 84 are bonded to the frame of the collector.

The ducts used in the collectors of FIGS. 8 and 10 may include an internal heat transfer member(s) as exemplified in FIGS. 4 and 5.

The described construction provides a solar collector system of the air exchange type where the air duct is completely insulated from the frame. Thus, there is little or no loss of thermal energy from the heated air to the collector frames. Moreover, a collector may be removed from an array for repair and replaced without damaging the integrity of the seals.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. In a solar collector of the air heat exchange type including a housing member in which the air passes through a duct whose upper surface is an absorber, and where the air passes from one collector to another, the improvement comprising means defining an air duct in said housing out of thermal conductive contact with said housing, said housing having openings in at least one side wall thereof, said duct extending between said housing openings with the ends of the duct very close to but out of contact with the edges defining said openings, the ends of said duct being aligned with said openings, a thermally insulating resilient sealing member surrounding said openings at the edges thereof and secured to said housing, whereby when two of said collectors are joined with the openings aligned, said sealing means compressively and resiliently engages and provides an air seal about said openings and ducts in said housings are aligned and in direct communication across said openings.

2. A system embodying at least two collectors as defined in claim 1 and further including means for holding adjacent collectors in spaced relation with the seals of adjacent collectors in compressive engagement.

3. The collector of claim 1 where the frame of said housing is formed with interlocks and said sealing member is provided with a locking tab releasably locked in said interlocks.

4. The collector of claim 1 wherein said sealing members are adhered to said collector housing at the edges of said openings.

5. The collector of claim 1 wherein said sealing members are of a closed cell construction and define an internal channel therethrough.

6. The collector of claim 1 wherein said sealing members are configured to have plural areas of contact along the lengths thereof.

7. The collector of claim 1 wherein said sealing member has an extension thereon extending through the opening in the collector and overlying said duct to thermally insulate the housing from air flow through the duct.

8. The collector of claim 1 where the frame of said housing is formed with protruding tabs about said openings, and said sealing members are provided with a locking tab releasably receiving said tabs.

9. The collector of claim 8 where said sealing members are adhered to said collector housing at the edges of said openings.

10. An array of solar collectors comprising at least two adjacent collectors having housings with absorbers therein, said absorbers being in the form of a duct where airflow passes beneath the absorber, openings defined in adjacent walls of said housings and aligned with said ducts, said ducts extending very close to said openings but out of contact with said housings, resilient sealing members surrounding said openings at the edges thereof and secured to said housings, said housings being positioned together with the adjacent openings aligned and the ends of said ducts aligned, said sealing means on each of said housings being in compressive engagement and providing a seal about the openings in said collectors.

11. The collectors of claim 10 where the frame of said housings are formed with interlocks and each sealing member is provided with a locking tab releasably locked in said interlocks of a frame.

12. The collectors of claim 10 wherein said sealing members are adhered to said collector housing at the edges of said openings.

13. The collectors of claim 10 wherein said sealing members are of a closed cell construction and define an internal channel therethrough.

14. The collectors of claim 10 wherein said sealing members are configured to have plural areas of contact along the lengths thereof.

15. The collector of claim 10 wherein said sealing members have an extension thereon extending through the opening in the collector and overlying said duct to thermally insulate the housing from airflow through the duct.

16. The collectors of claim 1 where the frames of said housings are formed with protruding tabs about said openings, and said sealing members are provided with a locking tab releasably receiving said tabs.

* * * * *